(12) United States Patent
Fleetwood

(10) Patent No.: US 6,669,419 B1
(45) Date of Patent: Dec. 30, 2003

(54) PROBE LOCKING WASHER

(75) Inventor: Stephen W. Fleetwood, Knoxville, TX (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 10/104,898

(22) Filed: Mar. 22, 2002

Related U.S. Application Data

(63) Continuation-in-part of application No. 29/154,305, filed on Jan. 25, 2002.

(51) Int. Cl.[7] ............................ F16B 39/10; F16B 39/24
(52) U.S. Cl. .................... 411/131; 411/120; 411/160; 411/533
(58) Field of Search ................... 411/119, 120, 411/124, 130, 131, 160, 533

(56) References Cited

U.S. PATENT DOCUMENTS

| | | | | |
|---|---|---|---|---|
| 3,190,334 A | * | 6/1965 | Wigam | 411/131 |
| 3,351,116 A | * | 11/1967 | Madsen | 411/131 X |
| 5,711,644 A | * | 1/1998 | Regnath et al. | 411/131 |

FOREIGN PATENT DOCUMENTS

| | | | | |
|---|---|---|---|---|
| GB | 174836 | * | 2/1922 | 411/130 |

* cited by examiner

*Primary Examiner*—Neill Wilson
(74) *Attorney, Agent, or Firm*—Pitts & Brittian, P.C.

(57) ABSTRACT

A probe locking washer (10) for substantially preventing unwanted loosening of a probe mounted on a receiver unit of an animal training device in which the receiver unit is mounted on an animal collar. The probe locking washer (10) of the present invention includes a disk member (25) having an upper surface (30) and a lower surface (35) and a centrally disposed hole member (40) which allows the probe locking washer (10) to be mounted on the mounting post (20). The probe locking washer (10) also includes a countersink member (45) disposed in the lower surface (35) of the disk member (25) and which includes a plurality of internal radial spline teeth (50) for providing radial resistance to any untightening force caused by vibration or other untightening force. Additionally, the upper surface (30) of the disk member (25) carries a raised rib (55) that is configured so as to surround and register with the external shape of the probe (15) thus engaging the probe (15) in a manner that substantially prevents rotation of the probe (15) within the rib (25). Thus, the rib (55) locks the probe (15) to the probe locking washer (10) and radial spline teeth (50), which are disposed in the countersink member (45), substantially lock the probe locking washer (10) to the mounting post (20) on which the probe is secured. In this manner, unwanted rotation of the probe is substantially prevented.

17 Claims, 6 Drawing Sheets

PROBE LOCKING WASHER

CROSS-REFERENCE TO RELATED APPLICATIONS

This application is a continuation-in-part of U.S. patent application Ser. No. 29/154,305 filed Jan. 25, 2002.

STATEMENT REGARDING FEDERALLY SPONSORED RESEARCH OR DEVELOPMENT

Not Applicable

BACKGROUND OF THE INVENTION

1. Field of Invention

This invention pertains to a device for securing the receiver unit of an animal training device to an animal collar. More particularly, it relates to a probe locking washer for securing the probes of the receiver to the receiver and the receiver to the collar.

2. Description of the Related Art

In the field of animal training devices, such as bark control devices, containment devices and sport dog, or retriever, trainers, it is commonly known to mount the receiver component of an animal training apparatus to the animal's collar. Typically, this receiver includes two probes, which are threadably secured to mounting posts, which deliver the training stimulus to the animal. In certain configurations, the receiver is secured to the collar by passing the mounting posts through holes provided in the collar. The probes, and a washer are then secured to the mounting posts such that the washer is mounted between the probe and the collar. However, mechanical vibration, induced by either the movement of the animal, or in some cases, by the device itself, can cause the probes to loosen even to the point of the probes becoming detached from the mounting posts allowing the receiver to become detached from the collar. In this manner, the receiver can be, for all practical purposes, irretrievably lost. And, a number of techniques have been developed to reduce the tendency of the probe from becoming loose. In certain devices, the probes are held in place simply by thread interference caused chiefly by the tightening torque supplied during assembly. Also, one receiver produced by the assignee of the present invention includes a raised, annular rib that has an interior configuration adapted to register with a nut carried by the mounting post. See FIG. 1A. Further, the raised annular rib includes a plurality of splines, or keys, that engage a plurality of notches, or keyways, molded into the case. The combination of the engagement of the annular rib with the nut on the mounting post and the cooperating keys and keyways serve to substantially inhibit unwanted rotation of the washer. However, the state of the art washer was not equipped to inhibit unwanted rotation of the probe itself.

Accordingly, it is an object of the present invention to provide a probe locking washer designed to inhibit unwanted rotation of a probe on a collar mounted receiver component of an animal training device.

Another object of the present invention is to provide a probe locking washer that includes a hex shaped rib that conforms to the external configuration of the probe so as to lock the probe to the washer to substantially inhibit unwanted rotation of the probe in relation to the washer.

Still another object of the present invention is to provide a probe locking washer that includes spline teeth to frictionally engage the mounting post and provide radial resistance to any unwanted untightening force.

BRIEF SUMMARY OF THE INVENTION

According to one embodiment of the present invention, a probe locking washer is provided. Certain types of animal training devices utilize a transmitter and a receiver. And, it is commonly known to mount the receiver to the animal's collar. In certain animal training devices, the training stimulus is an electrical stimulus delivered to the animal via a pair of probes. Typically, the probes are threadably secured to mounting posts. In order to prevent unwanted rotation of the probe, with respect to the receiver, a probe locking washer which includes countersink member, carried by the lower surface of the probe locking washer, includes a plurality of internal radial spline teeth which engage a boss at the base of each mounting post when the probe is secured to the receiver. Further the upper surface of the probe locking washer carries a raised rib that is configured so as to surround and register with the external shape of the probe thus engaging the probe in a manner that substantially prevents rotation of the probe within the rib. Thus, the rib locks the probe to the probe locking washer and the countersink member with the associated internal radial spline teeth substantially locks the probe locking washer to the boss of the mounting post. In this manner, unwanted rotation of the probe is substantially prevented.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1A:
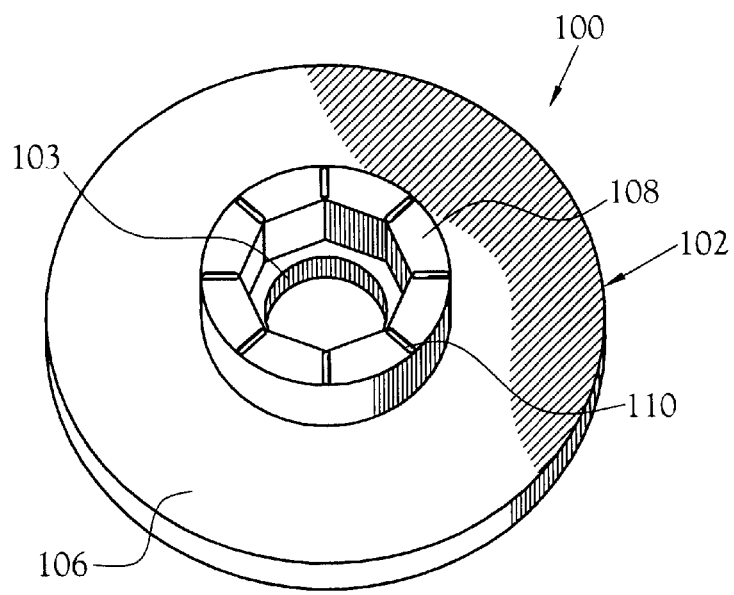
FIGS. 1A and 1B illustrate a prior art probe washer.
Figure 1B:
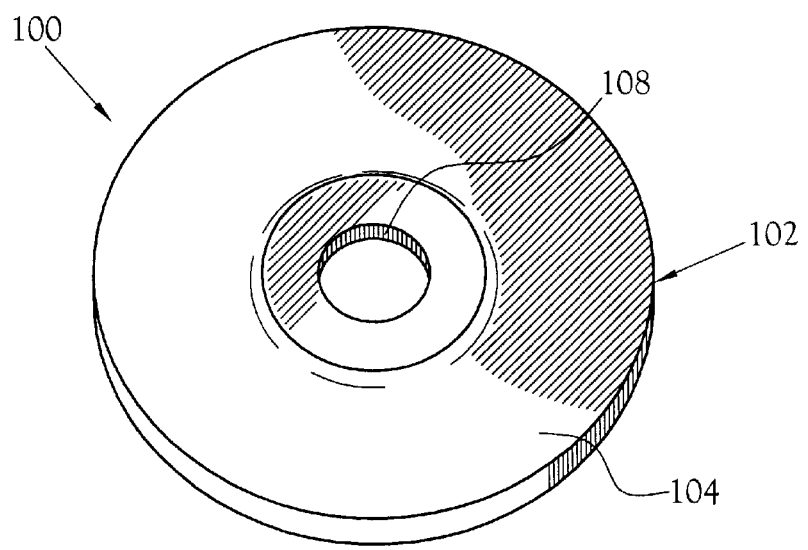
Figure 2:
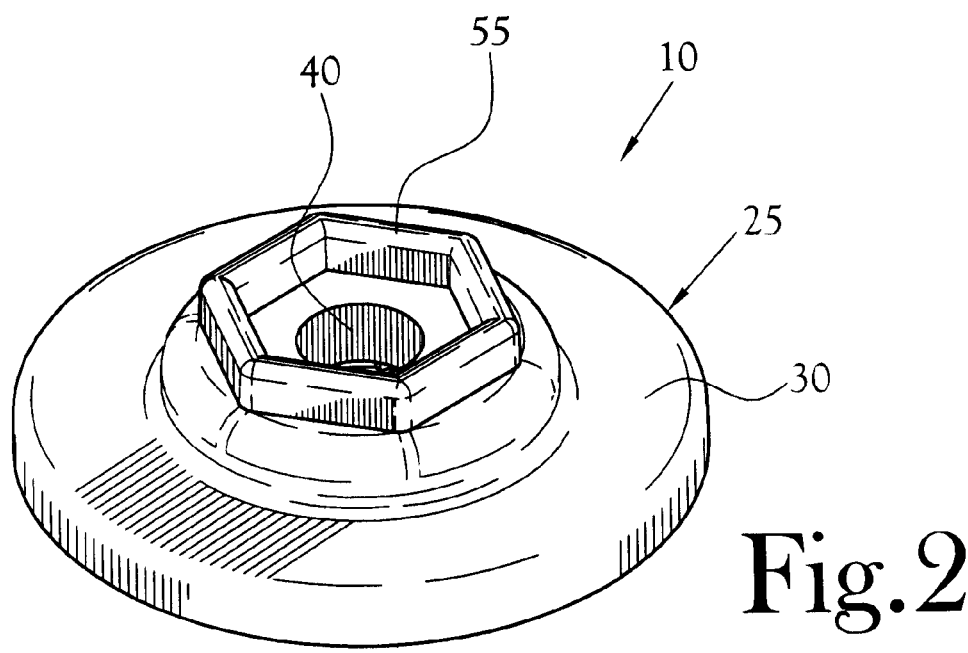
FIG. 2 is a perspective view of the probe locking washer of the present invention.
Figure 3:
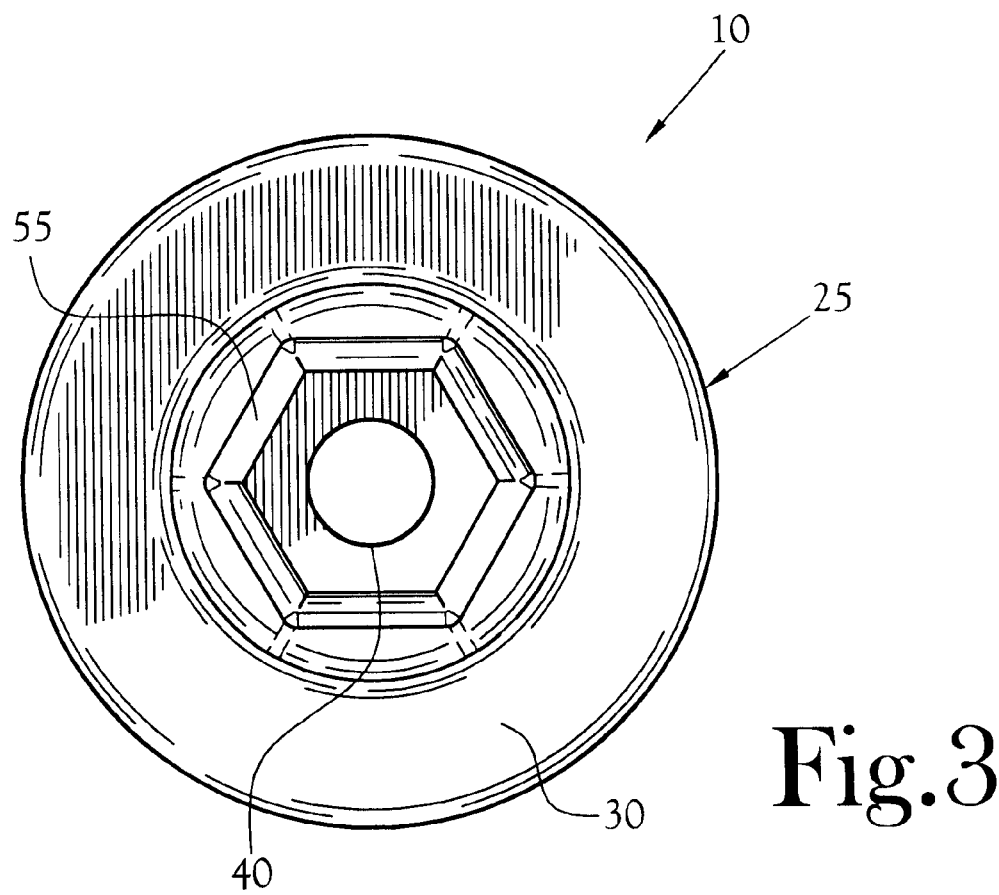
FIG. 3 is a top plan view of the present probe locking washer.

A probe locking washer, constructed in accordance with the present invention, is illustrated generally as 10 in the figures. Certain types of animal training devices utilize a transmitter (not shown) and a receiver 12. The receiver 12 delivers a training stimulus to the animal (not shown). While there are a number of stimuli that are known, such as sound, vibration or a spray, it is common to deliver an electrical stimulus to the animal via a pair of probes 15. It is commonly known to mount the receiver to the animal's collar 17. Typically, the probes 15 are threadably secured to mounting posts 20 that are inserted through aligned holes 22 in the collar 17 (see FIGS. 7A and 7B). In certain configurations, the receiver is secured to the collar by passing the mounting posts through holes provided in the collar. As illustrated in FIGS. 1A and 1B, a prior art probe locking washer 100 includes a substantially circular disk member 102 having a flat upper surface 104 that engages the probe 15, a flat lower surface 106 and a centrally disposed hole member 103. The lower surface 106 carries a raised, annular rib 108 that has an hexagonally shaped interior configuration adapted to register with a nut (not shown) carried by the mounting post. The raised annular rib 108 includes a plurality of splines, or keys 110, that engage a plurality of notches, or keyways, (not shown) molded into the case.

Figure 4:
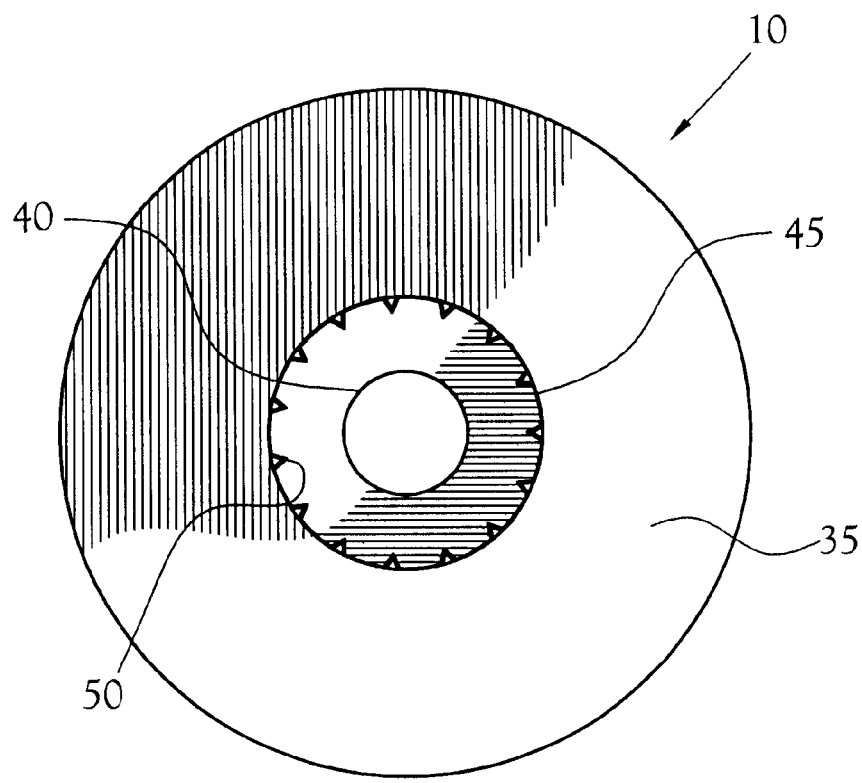
FIG. 4 is a bottom plan view of the present probe locking washer.
Figure 5:
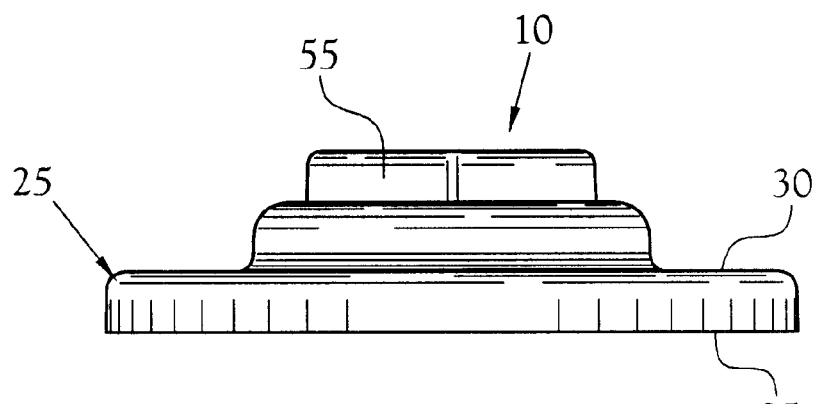
FIG. 5 is a side elevation view of the present probe locking washer.
Figure 6:
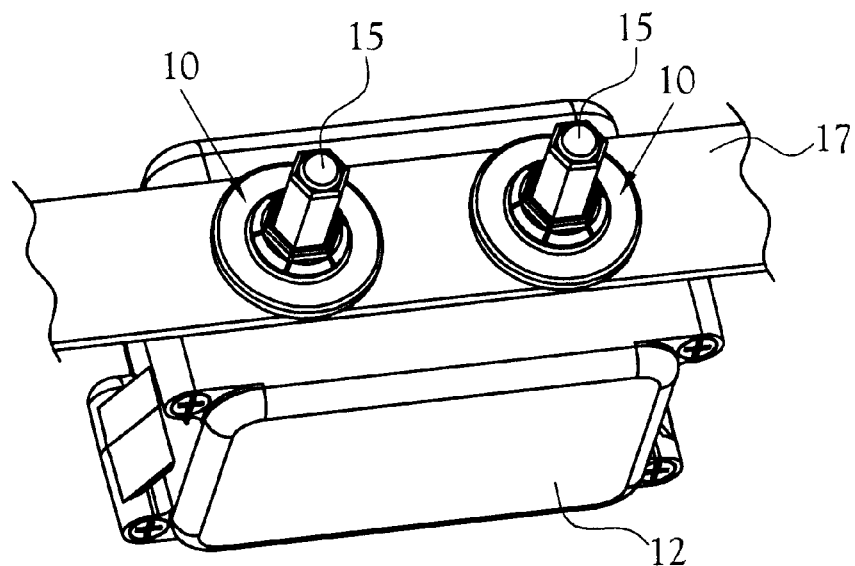
FIG. 6 is a perspective view of the probe locking washer as mounted on a collar and with the respective probes and associated training device.
Figure 7A:
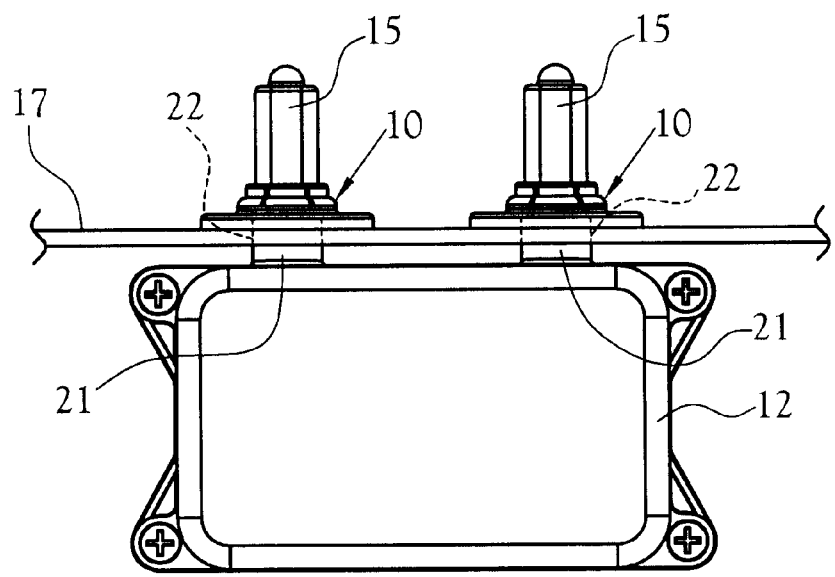
FIG. 7A is a side elevation view of the probe locking washer as illustrated in FIG. 6.
Figure 7B:
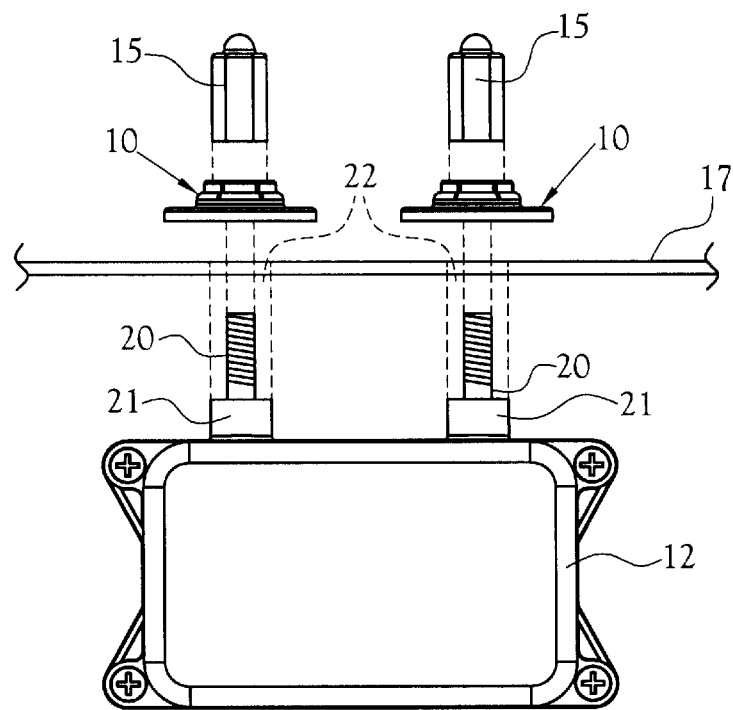
FIG. 7B is an exploded perspective view of the probe locking washer as illustrated in FIG. 6.
Figure 7C:
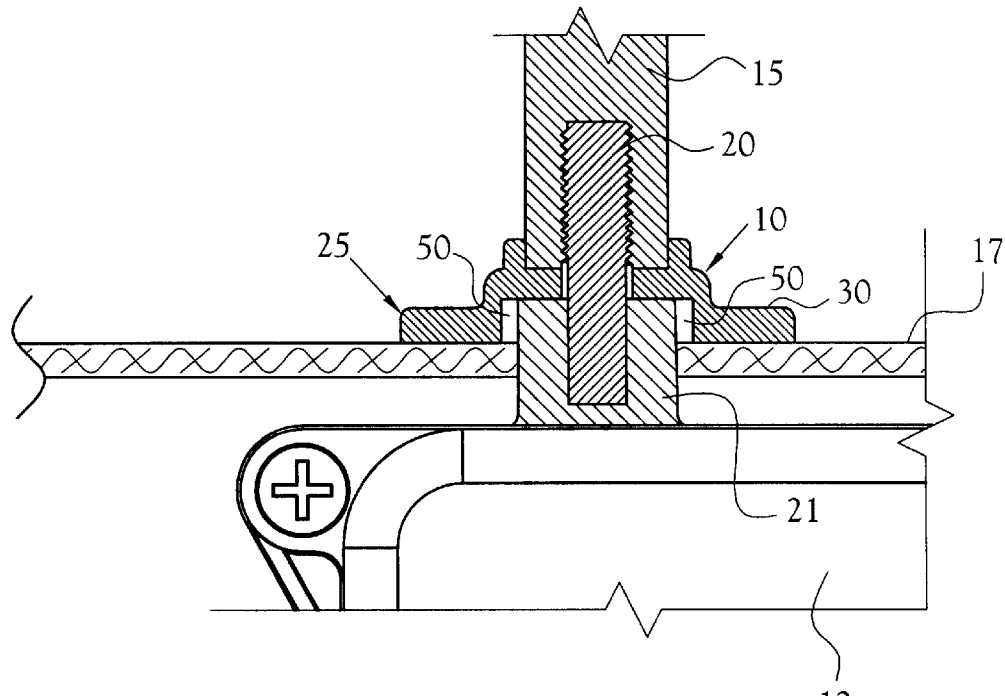
FIG. 7C is a side elevation view in partial cross-section of the probe locking washer as illustrated in FIG. 6.
Figure 8A:
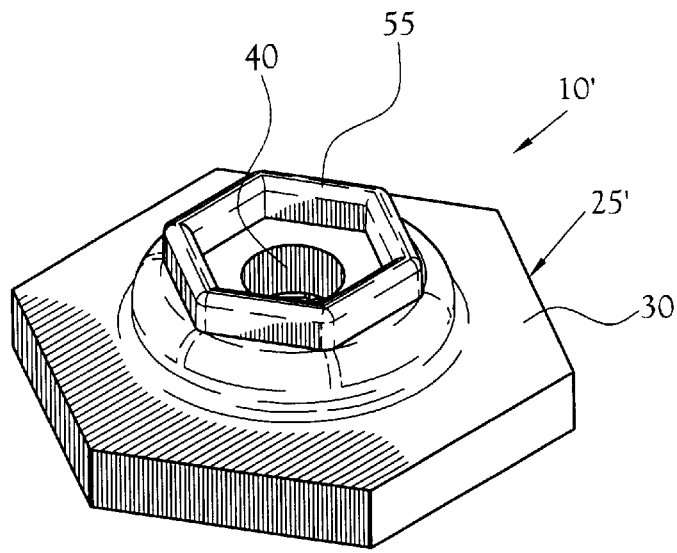
FIGS. 8A, 8b and 8C illustrate perspective views of alternative embodiments of the probe locking washer of FIG. 2.
Figure 8B:
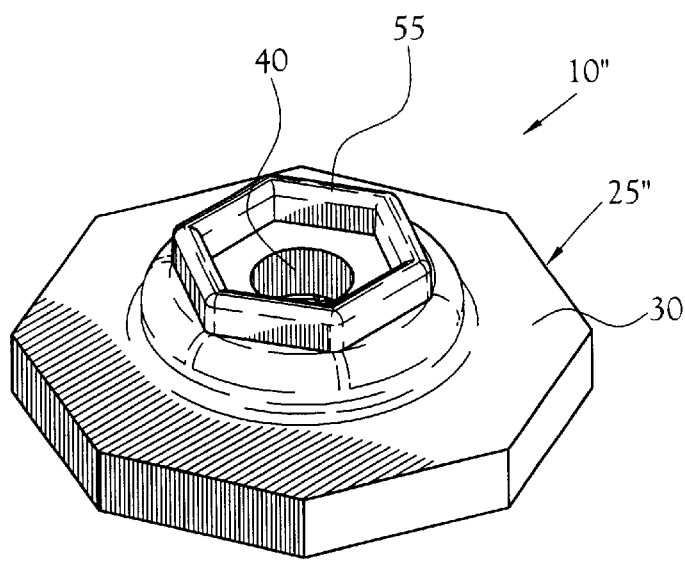
Figure 8C:
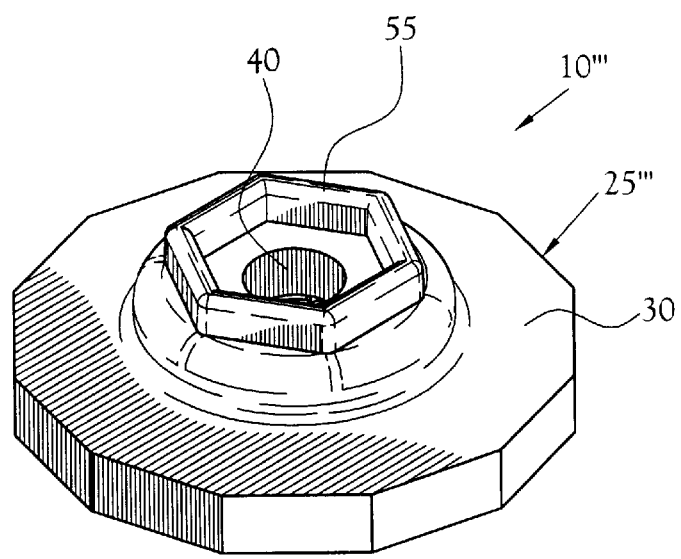

Contrariwise, the probe locking washer 10 of the present invention includes a disk member 25 having an upper surface 30 and a lower surface 35 and a centrally disposed hole member 40 which allows the probe locking washer 10 to be mounted on the mounting post 20. The mounting post 20 includes a boss 21 forming a base disposed on each mounting post 20, as illustrated in FIGS. 7A, 7B and 7C. Holes 22 in the collar 17 are sized so as to receive boss 21. While a circular disk member is illustrated in FIGS. 4–6, it will be appreciated by those skilled in the art that the disk member is not required to be circular. In this regard an hexagonal disk member 25' or octagonal disk member 25", or other faceted disk member 25''', as illustrated in FIGS. 8A, 8B and 8C could also be utilized without departing from the present invention. The probe locking washer 10 also includes a countersink member 45 disposed in the lower surface 35 of the disk member 25. The countersink member 45 includes a plurality of internal radial spline teeth 50 which engage the boss 21 of each respective mounting post 20 when the probe 15 and probe locking washer 10 is secured to the receiver 12. In the preferred embodiment, the radial spline teeth 50 have tapered points which frictionally engage an outer perimeter of each boss 21 in order to substantially prevent each respective countersink member 45 from rotating relative to each boss 21. Further, the radial spline teeth 50 provide radial resistance to any undesired rotation of the probe locking washer 10 due to any untightening force caused by vibration or other untightening force.

In order to prevent rotation of the probe 15 in relation to the probe locking washer 10, the upper surface 30 of the disk member 25 carries a raised rib 55 that is configured so as to surround and register with the external shape of the probe 15 thus engaging the probe 15 in a manner that substantially prevents rotation of the probe 15 within the rib 55. In this regard, in the preferred embodiment, the probe 15 has an hexagonal cross-section and the rib 55 defines a hexagon sized so as to tightly receive the base of the probe 15 therein (see FIGS. 7A, 7B and 7C). Thus, the rib 55 locks the probe 15 to the probe locking washer 10. In addition the plurality of internal radial spline teeth 50, which are disposed in the countersink member 45, substantially frictionally engage each respective boss 21 and lock each probe locking washer 10 to each boss 21 of each mounting post 20. In this manner, unwanted rotation of the each probe 15 is substantially prevented.

From the foregoing description, it will be recognized by those skilled in the art that a probe locking washer offering advantages over the prior art has been provided. Specifically, the probe locking washer of the present invention provides a probe locking washer designed to inhibit unwanted rotation of a probe on a collar mounted receiver component of an animal training device and that includes a rib configured so as to conform to the external configuration of the probe so as to lock the probe to the washer to substantially inhibit unwanted rotation of the probe in relation to the washer.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, I claim:

1. A probe locking washer for substantially preventing unwanted rotation of a probe mounted on a mounting post having a boss forming a base disposed on a receiver of an animal training device, said probe locking washer comprising;
   a disc member having an upper surface and a lower surface and a centrally disposed hole member;
   a countersink member disposed in said lower surface of said disk member and adapted for receiving the boss when said disc member is disposed proximal of the base of the mounting post;
   a plurality of internal radial spline teeth carried by said countersink member; and
   a raised rib member carried by said upper surface of said disc member adapted for receiving the probe and for substantially preventing rotation of the probe within said rib member.

2. The probe locking washer of claim 1 wherein said disk member is circular.

3. The probe locking washer of claim 1 wherein said disk member is hexagonal.

4. The probe locking washer of claim 1 wherein said disk member is faceted.

5. The probe locking washer of claim 1 wherein said disk member is octagonal.

6. The probe locking washer of claim 1 wherein said probe has an hexagonal cross-section and said rib defines a hexagon sized so as to tightly receive the probe, whereby said rib locks the probe to said probe locking washer.

7. The probe locking washer of claim 1 wherein said internal radial spline teeth have tapered points disposed inwardly for frictionally engaging the boss when said probe locking washer is mounted proximal of the base of the mounting post.

8. A probe locking washer for substantially preventing unwanted rotation of a probe mounted on a mounting post having a boss forming a base disposed on a receiver of an animal training device, said probe locking washer comprising;
   a disc member having an upper surface and a lower surface and a centrally disposed hole member;
   a countersink member disposed in said lower surface of said disk member and adapted for receiving the boss when said disc member is disposed proximal of the base of the mounting post;
   a plurality of internal radial spline teeth carried by said countersink member, wherein said internal radial spline teeth have tapered points; and a raised rib member carried by said upper surface of said disc member adapted for receiving the probe and for substantially preventing rotation of the probe within said rib member.

9. The probe locking washer of claim 8 wherein said disk member is circular.

10. The probe locking washer of claim 8 wherein said disk member is hexagonal.

11. The probe locking washer of claim 8 wherein said disk member is faceted.

12. The probe locking washer of claim 8 wherein said disk member is octagonal.

13. A probe locking washer for substantially preventing unwanted rotation of a probe mounted on a mounting post having a boss forming a base disposed on a receiver of an animal training device, said probe locking washer comprising;

a disc member having an upper surface and a lower surface and a centrally disposed hole member;

a countersink member disposed in said lower surface of said disk member and adapted for receiving the boss when said disc member is disposed proximal of the base of the mounting post;

a plurality of internal radial spline teeth disposed within said interior of said countersink member, said countersink member for engaging the boss forming the base of the mounting post when the probe is secured to the mounting post; and a raised rib member carried by said upper surface of said disc member adapted for receiving the probe and for substantially preventing rotation of the probe within said rib member, wherein said probe has an hexagonal cross-section and said rib member defines a hexagon sized so as to tightly receive the probe, whereby said rib member locks the probe to said probe locking washer, whereby said rib member locks the probe to the probe locking washer while said plurality of internal radial spline teeth frictionally engage the boss forming the base of the mounting post, thereby substantially preventing undesired rotation of the probe and said probe locking washer due to vibration when the probe is secured to the mounting post.

14. The probe locking washer of claim 13 wherein said disk member is circular.

15. The probe locking washer of claim 13 wherein said disk member is hexagonal.

16. The probe locking washer of claim 13 wherein said disk member is faceted.

17. The probe locking washer of claim 13 wherein said disk member is octagonal.

* * * * *